Nov. 9, 1937.  E. MASSON  2,098,689

APPARATUS FOR AUTOMATICALLY RECORDING UNUSUAL OR ACCIDENTAL OCCURRENCES

Filed March 8, 1935  2 Sheets-Sheet 1

Nov. 9, 1937.  E. MASSON  2,098,689
APPARATUS FOR AUTOMATICALLY RECORDING UNUSUAL OR ACCIDENTAL OCCURRENCES
Filed March 8, 1935   2 Sheets—Sheet 2
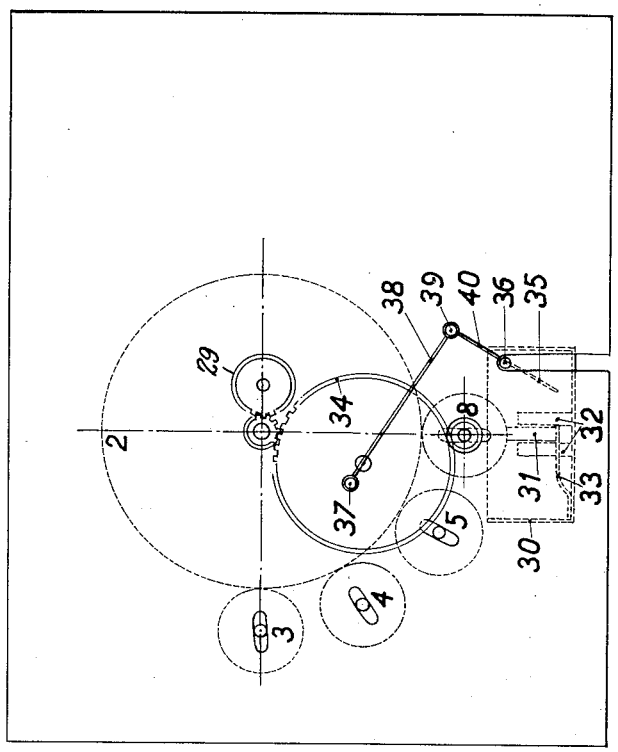
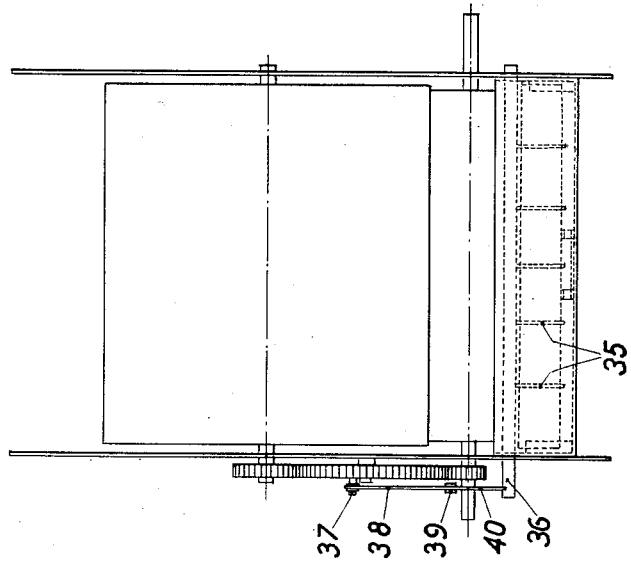

Patented Nov. 9, 1937

2,098,689

UNITED STATES PATENT OFFICE 2,098,689

APPARATUS FOR AUTOMATICALLY RECORDING UNUSUAL OR ACCIDENTAL OCCURRENCES

Emile Masson, St. Maurice, France

Application March 8, 1935, Serial No. 10,041

13 Claims. (Cl. 234—1.5)

The invention relates to apparatus for automatically recording occurrences of any kind, the course of which can be transferred in the form of deflections or vibrations to an indicating recording means and is a continuing application in part of my copending application Serial No. 642,575, filed November 14, 1932.

The invention is intended particularly for recording abnormal courses of accidental or unusual occurrences. As these occurrences can appear at any unforeseen moment, it has hitherto been necessary to continuously record the occurrence, the course of which is to be watched. Consequently if the normal conditions exist for long periods excessive recording is involved. If the unusual course of the occurrence is such that it requires for its examination a high unwinding speed of the recording strip, as for example is the case in indicating short circuits or excess voltages in transmitting and distributing networks of electrical energy, the lengths of the recorded strip become too long for practical purposes.

By means of the present invention these disadvantages are avoided and certain advantages indicated below are attained. The essence of the invention consists in the employment of a device on which are shown the amplitudes of the occurrence to be watched and in the employment of a second device—the recording device proper— which reproduces the indications of the first device.

The invention and its aims and objects will be readily understood from the following description taken in connection with the accompanying drawings of one illustrative embodiment of the invention herein given, the true scope of the invention being more particularly pointed out in the appended claims.

In the drawings:

Fig. 3 is a lateral elevation of an illustrative embodiment of the invention similar to Fig. 1, comprising five oscillographs for example, and showing the main automatic inking means;

Fig. 4 is a top plan view of the illustrative embodiment of the invention shown in Fig. 3.

Figure 1:
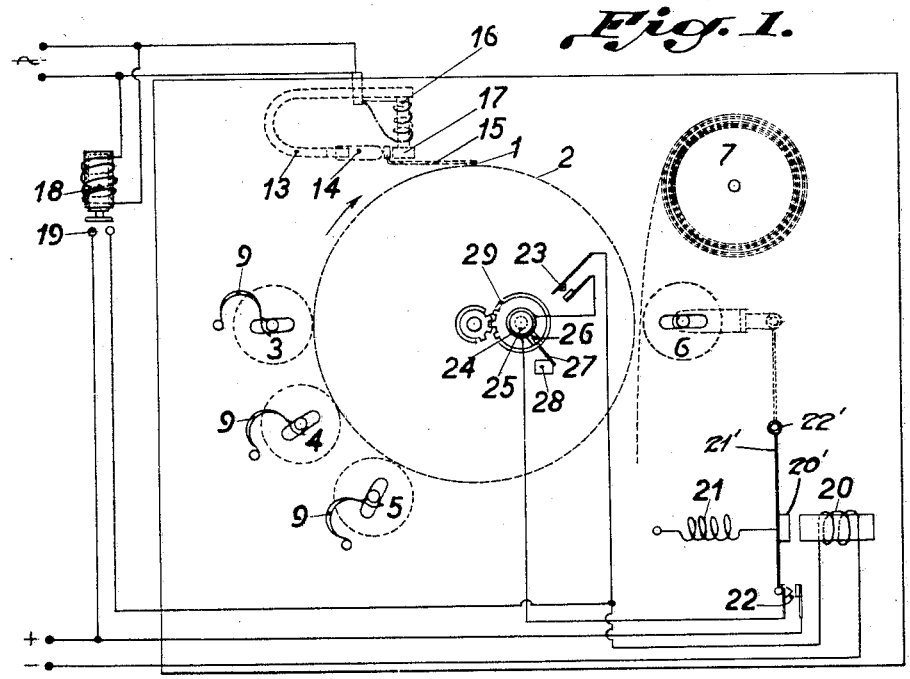
Fig. 1 is a lateral elevation of one illustrative embodiment of the invention in its application to an oscillograph for recording irregularities in electric lines and the like, the main inking means being omitted.

Referring to Fig. 1, the apparatus therein shown is suitable for use in dealing with oscillographic recording of abnormal voltage or current variations in an electrical network or other physical conditions and variations therein. A writing stylus is indicated by the numeral 1 in Fig. 1 and records the vibrations imparted thereto on a cylinder 2. Said cylinder is coated with a fatty special color or ink which is not affected by air and is rotated continuously in the direction of the arrow. The indication on the cylinder is continuously wiped out by the pressure of the rolls 3, 4 and 5 which are frictionally driven by the cylinder and are also reciprocated axially by suitable means to be described. If now an unusual or accidental occurrence intervenes, such as a variation in the strength or voltage of a current for example, the stylus will respond and a relay 18 causes a roll 6 to press a paper sheet coming from a paper roll 7 against the cylinder. The paper receives the impression of the resulting marking before it is again wiped out by the rolls 3, 4 and 5.

The rolls 3, 4 and 5 supply a sufficient color reserve in order to provide a comparatively long marking or a plurality of successive markings. An automatic reserve of color is provided by roll 8 which normally dips into a color vat and is periodically pressed against the cylinder by a device set in operation by a relay or other apparatus.

In order to steady the movement of the stylus and avoid undesirable vacillation thereof and obtain a well defined marking, it is preferable to damp the stylus movement. This may be accomplished by adding to the ink with which the cylinder is covered a suitable lubricating or other medium having a certain consistency to give it a certain plasticity. The addition of a lubricant also presents the advantage that the wear and tear of the cylinder and of the stylus is reduced to a minimum. Where it is desired to make several markings on one and the same cylinder a plurality of styluses can be arranged on both sides of the cylinder which other things being equal enables the length of the cylinder to be reduced. The use of a lubricant or other medium to give consistency to the ink on the cylinder 2 also tends to steady the operation of the stylus which has its point directed in opposition to the direction of rotation of said cylinder.

The arrangement described has the advantage that in recording the totality of the unusual occurrence to be watched only the strip of ribbon necessary therefor is required with simple devices and without disturbing in any way the movement of the writing means.

Compared with recording apparatus generally the invention provides for recording only of the unusual parts of the occurrence to be watched or with only so much of the normal phenomenon before and after the abnormality, as will give a complete picture and for effecting every kind of record with a single apparatus in a quite continuous manner as the paper strips on which registration is effected are not wound on the cylinder and are not secured thereto.

Figure 2:
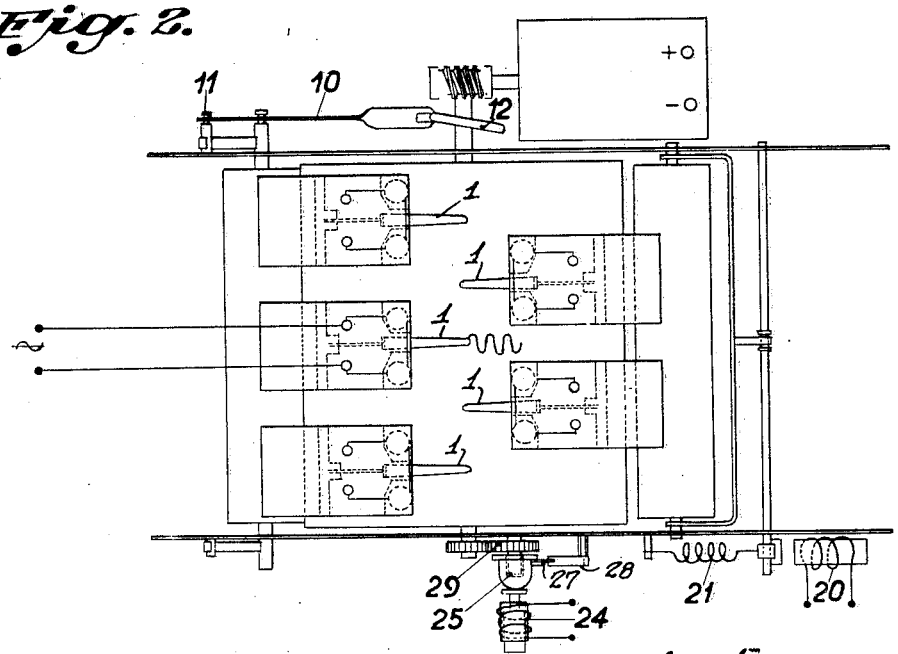
Fig. 2 is a top plan view of the embodiment of the invention shown in Fig. 1.

In Fig. 2, in order that the showing be clarified, the paper-holder roller 7 has not been shown and in Fig. 1, the oscillographs have not been shown on the right portions of the drawings.

On the other hand, there has been represented on the cylinder 2 a portion of the sinusoidal line traced by one of the styluses.

The cylinder 2 is of tempered steel and ground. The rollers 3, 4, 5 are constructed of gelatine and are axially displaceable in slots and applied against the cylinder by springs 9 whereby these rollers are frictionally driven by the cylinder which is itself driven by a worm drive from a shunt direct current motor.

The alternating translation movement of the rollers 3, 4, 5 is had by means of forks 10, oscillating around fulcrumed points 11 and actuated by a flat washer 12 secured angularly with respect to the cylinder 2 at an angle of approximately 30°. This alternating movement is adapted to obtain a uniform distribution of the ink.

Instead of three rollers, it is pointed out that two only could suffice, but it is preferable to utilize three in order to more completely erase the inscriptions.

The rolls 3, 4 and 5 provide a limited reserve of ink for cylinder due to the fact that, after an inscription is made, a part of the ink transferred to said rollers 3, 4, 5, in effacing it, is retransferred therefrom onto the cylinder 2.

The oscillographs proper are constituted by horseshoe magnets 13 having at one of their extremities very light armatures of steel 14 and extended by aluminum blades 15 provided at their extremity with sapphires 1 which trace a groove in the ink covering the cylinder 2. The magnets comprise at their other extremity a core of soft steel 16 terminated by pole pieces 17 and provided with a coil through which the current to be controlled flows. The steel blade 14 vibrates according to the frequency of the current traversing the coil. It is the friction of sapphires 1 upon the surface of cylinder 2 which as already pointed out insures the damping or steadying of the stylus movement necessary in order that the variations of the intensity of current may be correctly recorded by a well-defined marking free from vacillations. To this end, the ink may be constituted by a mixture of lamp-black and mineral grease such as that used in the lubrication of machines. Such an ink offers the dual purpose of not drying readily and of providing the necessary consistency to insure the regularity of the friction.

The figure shows an apparatus with five oscillographs. It can be seen that the cylinder 2 is shorter than if the five oscillographs were disposed on the same side. Due to the method employed, the friction of the styluses 1 is sufficiently soft and regular so that the latter are not hooked and lifted by the cylinder in movement.

The automatic operation in the illustrative embodiment of the invention shown in the drawings is as follows:

Assuming the physical phenomenon is proceeding normally, and the normal operation is being recorded, if any change or abnormality occurs in said operation, a drop in tension, for example, due to an accident on the line to be controlled, a given minimum tension relay 18 disposed outside the apparatus closes contact 19 and sends continuous current through the magnet 20, which acting upon the armature 20' on lever 21' pivoted at 22', attracts said lever against the resistance of spring 21 and presses the roller 6, which may be of brass, against the surface of cylinder 2, whereby the paper strip on roll 7 is clamped between said roll and the surface of said cylinder 2 and fed by the latter from roll 7. It thus takes an impression of the inscriptions traced by the styluses on said cylinder.

In the illustrative embodiment of the invention shown, the speed is regulated so that there elapses approximately 0.75 second between the time when a stylus traces an inscription on said cylinder and the time when this inscription reaches the point where the paper strip is pressed against the cylinder by the roll 6. As the operation of the relays requires approximately 0.25 second it will take approximately 0.50 second from the moment the paper strip is applied to the cylinder 2, before the registration of the unusual or accidental occurrence (variation in current tension for example) by a stylus reaches the point where said paper strip is applied to said cylinder by the operation of the relay consequent upon the unusual or accidental occurrence. There will therefore be recorded upon said paper strip a substantial length of the normal operation preceding the record thereupon of the unusual or accidental occurrence. At the same time that said magnet 20 presses said paper strip against the cylinder, it closes contact 22 thus short-circuiting magnet 24.

Immediately the tension returns to normal, the relay 18 reopens contact 19, but the paper strip remains in contact with the surface of cylinder 2 because the current of magnet 20 now passes through contact 22, contact 23 and magnet 24, said contact 23 being normally closed. The latter magnet clamps a friction band 25 upon wheel 29, said band carrying a finger 27. Up to this moment this friction band was released from said wheel by its counter weight 26, the finger 27 abutting against a fixed stop 28. The finger 27 being now rotated with wheel 29 opens contact 23 approximately 1.25 seconds after the opening of contact 19. Therefore only 1.25 seconds elapse after the end of the unusual or accidental occurrence before magnet 20 is de-energized and the paper strip is withdrawn from contact with the surface of cylinder 2. There is thus recorded not only the unusual or accidental occurrence itself but also everything occurring during the half second following. A complete record is thus obtained, not only of the unusual or accidental occurrence itself but also of everything that occurred for a considerable period both before and after said unusual or accidental occurrence, and this without any needless consumption of paper. The apparatus is now ready to record a new incident.

It will be understood that the actual embodiment of the invention described may be varied in many respects. For example, the minimum tension relay 18 can be replaced by a maximum intensity relay. Furthermore, while in Fig. 2 only five oscillographs are shown, the number of oscillographs used may be varied as may be required without departing from the spirit of the invention. For instance a complete apparatus for three-phase work would comprise seven oscillographs, three for the tensions, three for the intensities, and the seventh to control the opening current of the circuit-breaker controlling the line in which the apparatus is connected.

Where the apparatus is to be used upon a movable object such as aircraft for example, the counterweight 28 will preferably be replaced by a spring and a paper winder for the paper strip will be added to enable the apparatus to function in all possible positions, to record accidental phenomena on board of the aircraft, for example, such as abnormal vibrations, irregularities of the motor, etc.

Suitable inking means is provided, herein comprising a roll 8 which may normally dip in an ink supply and arrange to apply ink from said supply to the surface of a cylinder 2 as required. For example a roller 8 of Fig. 3 could be caused to dip normally in an ink supply and periodically or continuously applied to cylinder 2. If applied periodically this could be done for example at the same time that the roller 6 is applied to the periphery of said cylinder to clamp said paper strip thereagainst. Mechanism similar to that used to actuate said roller 6 could be used to actuate the roller 8. Ink would thus be applied to said cylinder 2 throughout the entire time that the paper strip is pressed against said cylinder by said roll 6.

In Fig. 3 the inking means comprises said rollers 3, 4, 5 and said roller 8, which may be constructed of gelatine and permanently applied against cylinder 2 by means of springs 9, the spring for applying the roller 8 not being shown in order to simplify the drawings. The ink box 30 contains a longitudinal scraper 31 of steel mounted in guides 32 and applied by a spring 33 along the whole length of the inside generatrix of the roller 8. This scraper returns into the box the excess of ink regularly taken by the fingers 35 secured to the shaft 36 and which, by means of the crank pin 37, connected to the gear 34, are provided with an alternating movement by means of the connecting rod 38, the link 39 and the crank 40. For each turn of the gear 34, the fingers 35 dip into the ink box and take therefrom a drop of ink which is deposited on roller 8, irrespective of whether or not such ink is consumed, that is, whether the paper is applied or not, the thickness of the ink coating so deposited onto the system, 2, 3, 4, 5, 8 being automatically regulated by a suitable pressure of the spring 33 upon the scraper 31.

The regularity of inking resulting from this arrangement permits to suppress the alternating movement of the rollers 3, 4, 5 imparted by the members 10, 11, 12 of Figure 2. In this case also, and for the same reason, two inking rollers could be sufficient and that is, roller 8 and one of the rollers 3, 4 or 5.

It is necessary to drive the roller 8 by means of the gear 34 because, due to the friction of the scraper 31, the cylinder 2 could not drive the roller 8 exclusively by friction.

In the case of automatic inking it is necessary also that the ink be more fluid than that used in the case of the non-automatic inking. For the apparatus described, a mixture of vaseline and lampblack is suitable. For apparatus revolving at very slow speed (recording voltmeters, for example) there is added from five to twenty per cent of resin, since the coating of ink on the cylinder 2 depends upon the speed of rotation of the latter. An apparatus provided with the automatic continuous inking is suitable not only for the recording of accidental phenomena but also for continuous recording.

I am aware that my present invention may be embodied in other specific forms than that herein described without departing from the spirit or essential attributes thereof, and I therefore desire the present embodiment of said invention to be considered in all respects as illustrative and not restrictive, reference being had to the appended claims rather than to the foregoing description to indicate the scope of the invention.

I claim:

1. Recording apparatus, comprising, in combination, means for recording physical quantities, said means including a marker and a cooperating recording surface movable relatively to said marker and capable of transferring a record made thereon; means to operate said recording means to make a record of a physical quantity upon said recording surface; a second surface adjacent said recording surface; and means controlled by an abnormal variation in said physical quantity to move said second surface into contact with said recording surface to reproduce upon said second surface a record of said physical quantity, made upon said recording surface, comprising the variation in said record due to said abnormal variation in said physical quantity.

2. Recording apparatus comprising, in combination, means for recording physical quantities, said means including a marker and a cooperating recording surface movable relatively to said marker and capable of transferring a record made thereon; means to operate said record making means to make a record of a physical quantity upon said recording surface; a second surface adjacent said recording surface; and means controlled by an abnormal variation in said physical quantity to move said second surface into contact with said recording surface to reproduce upon said second surface a record of said physical quantity, made upon said recording surface, comprising the variation in said record due to said abnormal variation in said physical quantity; and means to feed said second surface in unison with said recording surface while said two surfaces are in contact.

3. Recording apparatus comprising, in combination, means for recording physical quantities, said means including a marker and a cooperating recording surface movable past said marker and capable of transferring a record made thereon; record obliterating means; a record reproducing surface adjacent said recording surface; means to move said recording surface past said marker, said record-reproducing surface and said record obliterating means in the order named; means to operate said record making means to make a record of a physical quantity upon said recording surface; means responsive to an abnormal variation in said physical quantity to move said record reproducing surface into contact with said recording surface to reproduce upon said reproducing surface the record, made upon said recording surface comprising the variation in said record due to said abnormal variation in said physical quantity; and means to actuate said obliterating means.

4. Recording apparatus comprising, in combination, means for recording physical quantities including a rotary cylinder and a marker, said cylinder having a recording surface to cooperate with said marker and capable of transferring a record made thereon; record obliterating means; a record reproducing surface adjacent the recording surface of said cylinder; means to rotate said cylinder to move its recording surface past said marker, said record reproducing surface and said record obliterating means, in the order named; means to operate said ma..er to make a record of a physical quantity upo.. aid recording surface; and means responsive t an abnormal variation in said physical quantity to move said record reproducing surface into contact with said recording surface to reproduce upon said reproducing surface the record made upon said recording surface comprising the variation in said record due to said abnormal variation in said physical quantity.

5. Recording apparatus comprising, in combination, means for recording physical quantities, including a stylus; a recording surface movable relatively to said stylus and having a coating adapted to steady the operation of said stylus and capable of transferring a record made thereon; means to operate said stylus to make a record of a physical quantity upon said coating; a second surface adjacent said recording surface; and means controlled by an abnormal variation in said physical quantity to move said second surface into contact with said coating to reproduce upon said second surface the record made upon said coating comprising the variation in said record due to said abnormal variation in said physical quantity.

6. Recording apparatus comprising, in combination, means for recording physical quantities, including a stylus and a rotary cylinder having upon its cylindrical surface a coating adapted to steady the operation of said stylus and capable of transferring a record made thereon; record obliterating means; record reproducing means comprising a paper strip adjacent the surface of said cylinder; means to rotate said cylinder to move its coating past said stylus, said strip of paper and said record obliterating means, in the order named; means to operate said stylus to make a record of a physical quantity upon said coating; and means responsive to an abnormal variation in said physical quantity to move said paper strip into contact with said coating to reproduce upon said strip the record made upon said coating comprising the variation in said record due to said abnormal variation in said physical quantities.

7. Recording apparatus comprising, in combination, means for recording physical quantities, comprising a marker and a recording surface movable past said marker and capable of transferring a record made thereon; means to operate said marker to make a record of a physical quantity upon said recording surface; a second surface adjacent said recording surface; means responsive to an abnormal variation in said physical quantity to move said second surface into contact with said recording surface to reproduce upon said second surface the record made upon said recording surface comprising the variation in said record due to said abnormal variation in said physical quantity; means adjacent said recording surface to obliterate the record made thereon; and actuating means for said obliterating means.

8. Recording apparatus comprising, in combination, means for recording physical quantities, comprising a marker and a recording surface movable relatively to said marker; means to apply a record receiving layer to said recording surface, said layer being capable of transferring a record made thereon; means to operate said marker to make a record of a physical quantity upon said layer; a second surface adjacent said recording surface; means responsive to an abnormal variation in said physical quantity to move said second surface into contact with said layer to reproduce upon said second surface the record made upon said layer comprising the variation in said record due to said abnormal variation in said physical quantity; and means to obliterate said record from said layer.

9. Recording apparatus comprising in combination, means for recording the voltage of an electric current; said means including a marker and a cooperating recording surface movable past said marker and capable of transferring a record made thereon; means to actuate said marker to make a record of said current voltage upon said moving recording surface; a second surface adjacent said recording surface; and means responsive to variation in the voltage of said current to move said second surface into contact with said recording surface to reproduce upon said second surface the record made upon said recording surface comprising the variation in said record due to said variation in said voltage.

10. Recording apparatus comprising, in combination, means for recording an electric current, said means including a marker and a cooperating recording surface movable past said marker and capable of transferring a record made thereon; means to actuate said marker to make a record of said current upon said moving recording surface; a second surface adjacent said recording surface; and means responsive to variation in said current to move said second surface into contact with said recording surface to reproduce upon said second surface the record made upon said recording surface comprising the variation in said record due to said variation in said current.

11. Recording apparatus comprising, in combination, means for recording physical quantities, including a marker and a cooperating recording surface movable past said marker and provided with a coating adapted to steady the operation of said marker and to transfer a record made thereon; means to actuate said marker to make a record of a physical quantity on said coating as said recording surface is moved past said marker; a second surface adjacent said recording surface; and means controlled by an abnormal variation in said physical quantity to move said second surface into contact with said recording surface to cause it to be moved in unison with said recording surface and to reproduce upon said second surface a record of said physical quantity made upon said recording surface and comprising the variation in said record due to the abnormal variation in said physical quantity.

12. Recording apparatus comprising, in combination, means for making a continuous record of physical quantities, comprising a stylus and a rotary cylinder having upon its cylindrical surface a recording coating adapted to steady the operation of said stylus and capable of transferring a record made thereon; means to rotate said cylinder; means to actuate said stylus to make a record of the physical quantity upon said coating of said rotating cylinder; record reproducing means comprising a paper strip feedable longitudinally; means responsive to an abnormal variation in said physical quantity to move said paper strip into contact with said coating at a point spaced from said stylus in the direction of rotation of said cylinder to reproduce upon said paper strip the record of said abnormal variation; means responsive to cessation of said abnormal variation to withdraw said paper strip after the end of the record of said abnormal variation has passed the point of contact of said strip with said coating, said strip while in contact with said coating being fed by contact and in unison therewith, the distance from said stylus to the point of contact of said strip with said coating being such as to insure reproduction upon said paper strip of the part of said record preceding that of said abnormal variation; and means acting upon said coating in the latter's passage from said strip to said stylus to obliterate said record.

13. Oscillographic recorder comprising, in combination, means for making a continuous record of physical quantities, including a stylus and a rotary cylinder having upon its cylindrical surface a recording coating containing a viscous medium to control the movement of the stylus so as to secure a clearly defined record, said coating being capable of transferring a record made thereon; means to rotate said cylinder relatively to said stylus; means to actuate said stylus to make a record of a physical quantity upon said coating as said cylinder rotates; record reproducing means comprising a paper strip feedable longitudinally; means responsive to an abnormal variation in said physical quantity to move said paper strip into contact with said coating at a point spaced from said stylus in the direction of rotation of said cylinder; means responsive to cessation of said abnormal variation to withdraw said paper strip from said coating after the record of said abnormal variation has passed the point of contact of said strip with said coating, said strip being fed in unison with the movement of rotation of said cylinder while in contact with said coating so as to reproduce upon said paper strip the record of said abnormal variation, and means acting upon said coating in the latter's passage from the point of contact of said paper strip therewith to said stylus to obliterate said record.

EMILE MASSON.